United States Patent
Bono et al.

(10) Patent No.: US 9,535,630 B1
(45) Date of Patent: Jan. 3, 2017

(54) LEVERAGING ARRAY OPERATIONS AT VIRTUALIZED STORAGE PROCESSOR LEVEL

(71) Applicant: EMC Corporation, Hopkinton, MA (US)

(72) Inventors: Jean-Pierre Bono, Westborough, MA (US); Frederic Corniquet, Le Pecq (FR); Miles A. de Forest, Bahama, NC (US); Himabindu Tummala, South Grafton, MA (US); Walter C. Forrester, Berkeley Heights, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 376 days.

(21) Appl. No.: 13/928,610

(22) Filed: Jun. 27, 2013

(51) Int. Cl.
G06F 12/00 (2006.01)
G06F 3/06 (2006.01)

(52) U.S. Cl.
CPC .................... *G06F 3/0689* (2013.01)

(58) Field of Classification Search
None
See application file for complete search history.

(56) References Cited

U.S. PATENT DOCUMENTS

| | | | |
|---|---|---|---|
| 6,370,614 B1 * | 4/2002 | Teoman et al. | 711/113 |
| 7,181,439 B1 * | 2/2007 | Lent | G06F 17/30067 |
| 7,254,685 B1 | 8/2007 | Cardente | |
| 7,631,155 B1 * | 12/2009 | Bono et al. | 711/156 |
| 7,676,628 B1 * | 3/2010 | Compton et al. | 711/114 |
| 7,770,059 B1 * | 8/2010 | Glade et al. | 714/6.32 |
| 8,386,721 B2 * | 2/2013 | Shimada | G06F 3/0605 711/113 |
| 8,433,869 B1 | 4/2013 | Natanzon et al. | |
| 9,286,007 B1 * | 3/2016 | Bono | G06F 3/0689 |
| 2004/0030668 A1 * | 2/2004 | Pawlowski et al. | 707/1 |
| 2004/0260861 A1 * | 12/2004 | Serizawa et al. | 711/4 |
| 2006/0248292 A1 * | 11/2006 | Suresh | 711/154 |
| 2007/0033362 A1 * | 2/2007 | Sinclair | 711/165 |
| 2009/0024678 A1 * | 1/2009 | Milby | G06F 3/0613 |
| 2009/0024752 A1 * | 1/2009 | Shitomi | 709/230 |
| 2010/0250630 A1 * | 9/2010 | Kudo | 707/822 |
| 2010/0306500 A1 * | 12/2010 | Mimatsu | 711/209 |
| 2012/0246642 A1 * | 9/2012 | Pafumi et al. | 718/1 |

(Continued)

OTHER PUBLICATIONS

Bono, "Unified Datapath Architecture," U.S. Appl. No. 13/828,322, filed Mar. 14, 2013.

(Continued)

*Primary Examiner* — Midys Rojas
*Assistant Examiner* — Tasnima Matin
(74) *Attorney, Agent, or Firm* — BainwoodHuang

(57) ABSTRACT

A technique for managing data storage operations in a data storage system having a file-based front end system and a block-based back end array includes provisioning a set of storage resources on the array for use exclusively with one or more virtualized storage processors (VSPs), where each VSP identifies multiple file systems. In response to a management command to perform a data storage operation on a VSP, the back-end array performs the specified operation on the provisioned set of storage resources. Thus, the back-end array performs the data operation exclusively on the VSP (or on multiple VSPs) and therefore on all of its constituent file systems as one.

24 Claims, 6 Drawing Sheets

(56) References Cited

U.S. PATENT DOCUMENTS

2012/0331242 A1* 12/2012 Shaikh ............... G06F 12/0261
711/154

OTHER PUBLICATIONS

Bono, et al., "Unified Datapath Processing With Virtualized Storage Processors," U.S. Appl. No. 13/828,294, filed Mar. 14, 2013.
Bono, et al., et al., "Automatically Creating Multiple Replication Sessions in Response to a Single Replication Command Entered by a User," U.S. Appl. No. 13/837,825, filed Mar. 15, 2013.
Bono, et al., "Virtual Storage Processor Load Balancing," U.S. Appl. No. 13/837,086, filed Mar. 15, 2013.
Bono, et al., "Providing Mobility to Virtual Storage Processors," U.S. Appl. No. 13/837,053, filed Mar. 15, 2013.
Bono, et al., "Providing Multi-Tenancy Within a Data Storage Apparatus," U.S. Appl. No. 13/837,869, filed Mar. 15, 2013.
Bono, et al., "Performing a Non-Disruptive Software Upgrade on Physical Storage Processors Having Access to Virtual Storage Processors," U.S. Appl. No. 13/838,498, filed Mar. 15, 2013.
Bono, et al., "Virtual Storage Processor Failover," U.S. Appl. No. 13/838,540, filed Mar. 15, 2013.
Bono, et al., "Unified Data Protection for Block and File Objects," U.S. Appl. No. 13/853,508, filed Mar. 29, 2013.
Bono, et al., "Unified Synchronous Replication for Block and File Objects," U.S. Appl. No. 14/041,176, filed Sep. 30, 2013.
Bono, et al., "Synchronous Replication of Virtualized Storage Processors," U.S. Appl. No. 14/041,191, filed Sep. 30, 2013.
Bono, et al., "Metro-Cluster Based on Synchronous Replication of Virtualized Storage Processors," U.S. Appl. No. 14/041,204, filed Sep. 30, 2013.
Bono, et al., "Unified Management of Sync and Async Replication for Block and File Objects," U.S. Appl. No. 14/041,238, filed Sep. 30, 2013.
EMC Corporation, "Configuring Virtual Data Movers on VNX," (http://corpusweb130.emc.com/upd_prod_VNX/UPDFinalPDF/jp/VDMs.pdf) Feb. 2011.
EMC Corporation, "Using EMC Celerra Replicator," Feb. 2009.
EMC Corporation, "EMC Celerra Replicator," (http://chucksblog.emc.com/content/CelerraReplicator.pdf) 2008.
EMC Corporation, "EMC RecoverPoint Family," (http://www.emc.com/collateral/software/data-sheet/h2769-recoverpoint-ds.pdf) Aug. 2013.
EMC Corporation, "EMC Business Continuity and Disaster Recovery Solutions," (https://enterpriseportalcontent.mci.com/NR/rdonlyresf7A037904-A72F-4C79-BC21-4731442BFD9A/0/SoCDREventEMCReplicationRW.pdf) 2008.
Bono, et al., "Unified Data Services for Block and File Objects," U.S. Appl. No. 13/853,284, filed Mar. 29, 2013.
Bono, et al., "Providing Virtual Storage Processor (VSP) Mobility With Induced File System Format Migration," U.S. Appl. No. 14/041,097, filed Sep. 30, 2013.
Bono, et al., "Embedded Synchronous Replication for Block and File Objects," U.S. Appl. No. 14/139,036, filed Dec. 23, 2013.
Bono, et al., "Snap and Replicate for Unified Datapath Architecture," U.S. Appl. No. 14/319,622, filed Jun. 30, 2014.

* cited by examiner

LEVERAGING ARRAY OPERATIONS AT VIRTUALIZED STORAGE PROCESSOR LEVEL

BACKGROUND

Data storage systems are arrangements of hardware and software that include one or more storage processors coupled to non-volatile storage devices. In typical operation, the storage processors service storage requests that arrive from users. The storage requests specify data elements to be written, read, created, or deleted, for example. The storage processors each may run software that manages incoming storage requests and performs various data processing tasks to organize and secure user data stored on the non-volatile storage devices.

Some data storage systems take the form of file-based systems, such as NAS (network-attached storage) systems. Such systems communicate with users of host computing devices ("hosts") using one or more file-based protocols, such as NFS (Network File System), CIFS (Common Internet File System), and/or SMB 3.0 (server message block), for example. File-based systems allow users to create and store file systems, and to export those file systems for access over a computer network. File-based systems typically provide advanced features, such as replication and snap, for protecting data and for allowing hosts to roll back their data to earlier points in time. These advanced features may be operated at the file system level, such that users may specify and direct performance of replication and snap operations on individual file systems.

Other data storage systems take the form of block-based arrays. Such arrays communicate with hosts using one or more block-based protocols, such as Fibre Channel, iSCSI, and/or InifiniBand, for example. In some examples, block-based arrays include multiple disk drives, electronic flash drives, and the like, and allow hosts to provision logical storage volumes from such drives. The arrays may export such volumes, called logical unit numbers, or "LUNs," to hosts using one or more of the above protocols, or some other protocol. Hosts may then access data on LUNs, e.g., for reading or writing, by specifying the particular LUN and a block offset range relative to the LUN. Arrays may also provide advanced features, such as replication and snap, for example, which operate at the level of individual LUNs.

In some arrangements, a file-based system provides a front end and connects to a block-based array, which operates as a back end. Hosts access one or more storage processors in the file-based system using a file-based protocol, and the file-based system accesses the array using a block-based protocol. Thus, the file-based system services requests from hosts while the block-based array efficiently stores host data.

SUMMARY

Users of file-based systems (e.g., NAS systems) often create and access tens, hundreds, or even more file systems. Unfortunately, however, conventional file-based systems typically require users to specify advanced features (e.g., replication and snap) on a per file system basis. For users of hundreds or more file systems, the burden of specifying these features for so many files systems becomes great. Users of combined systems, which employ a file-based front end with a block-based back end, typically face the same burdens, as the file-based systems on the front end continue to manage the file systems.

In contrast with the conventional approach of managing data storage operations on a file-based system, an improved technique for managing data storage operations in a data storage system having a file-based front end system and a block-based back end array includes provisioning a set of storage resources on the array for use exclusively with one or more virtualized storage processors (VSPs), where each VSP is associated with multiple file systems. Users (or internal processes) may issue management commands to perform data storage operations, such as replication and/or snap, on a designated VSP. In response to a management command to perform a data storage operation on a VSP, the back-end array performs the specified operation on the provisioned set of storage resources. Thus, the back-end array performs the data operation exclusively on the VSP (or on multiple VSPs) and therefore on all of its constituent file systems as one. Users may thus define and perform advanced features at the VSP level, rather than at the individual file system level, greatly reducing the burden placed on users to manage the advanced features. An additional benefit of the above-described technique is that it also leverages the advanced features of the back-end array, which may provide high-performance data processing and high efficiency.

Certain embodiments are directed to a method of managing data storage operations. The method includes directing a data storage array coupled to a storage processor to provision a set of storage resources on the array for storing multiple file systems of a VSP (virtualized storage processor) operated by the storage processor. The method further includes, in response to the storage processor receiving file-based requests to access files of the file systems of the VSP, sending block-based requests to the array to access content of the files from the set of storage resources. The method still further includes, in response to an issuance of a management command to perform a data operation on the VSP, directing the array to perform the data operation on each of the set of storage resources, thereby effecting the data operation by the array on the file systems of the VSP together as a group.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing data storage operations in a data storage system having a file-based front end system and a block-based back end array includes provisioning a set of storage resources on the array for use exclusively with one or more virtualized storage processors (VSPs), where each VSP identifies multiple file systems. In response to a management command to perform a data storage operation on a VSP, the back-end array performs the specified operation on the provisioned set of storage resources. Thus, the back-end array performs the data operation exclusively on the VSP (or on multiple VSPs) and therefore on all of its constituent file systems as one.

Efforts are underway to develop virtualized storage processors (VSPs). VSPs allow users to aggregate any number of file systems within a single construct and to associate the aggregated file systems with a particular set of file-based servers, such as NFS servers and/or CIFS servers, for example. Earlier constructs for aggregating file systems are known in the art as virtual data movers, or "VDMs." More information about VSPs may be found in copending U.S. patent application Ser. No. 13/828,294, filed Mar. 14, 2013, the contents and teachings of which are hereby incorporated by reference in their entirety.

Figure 1:
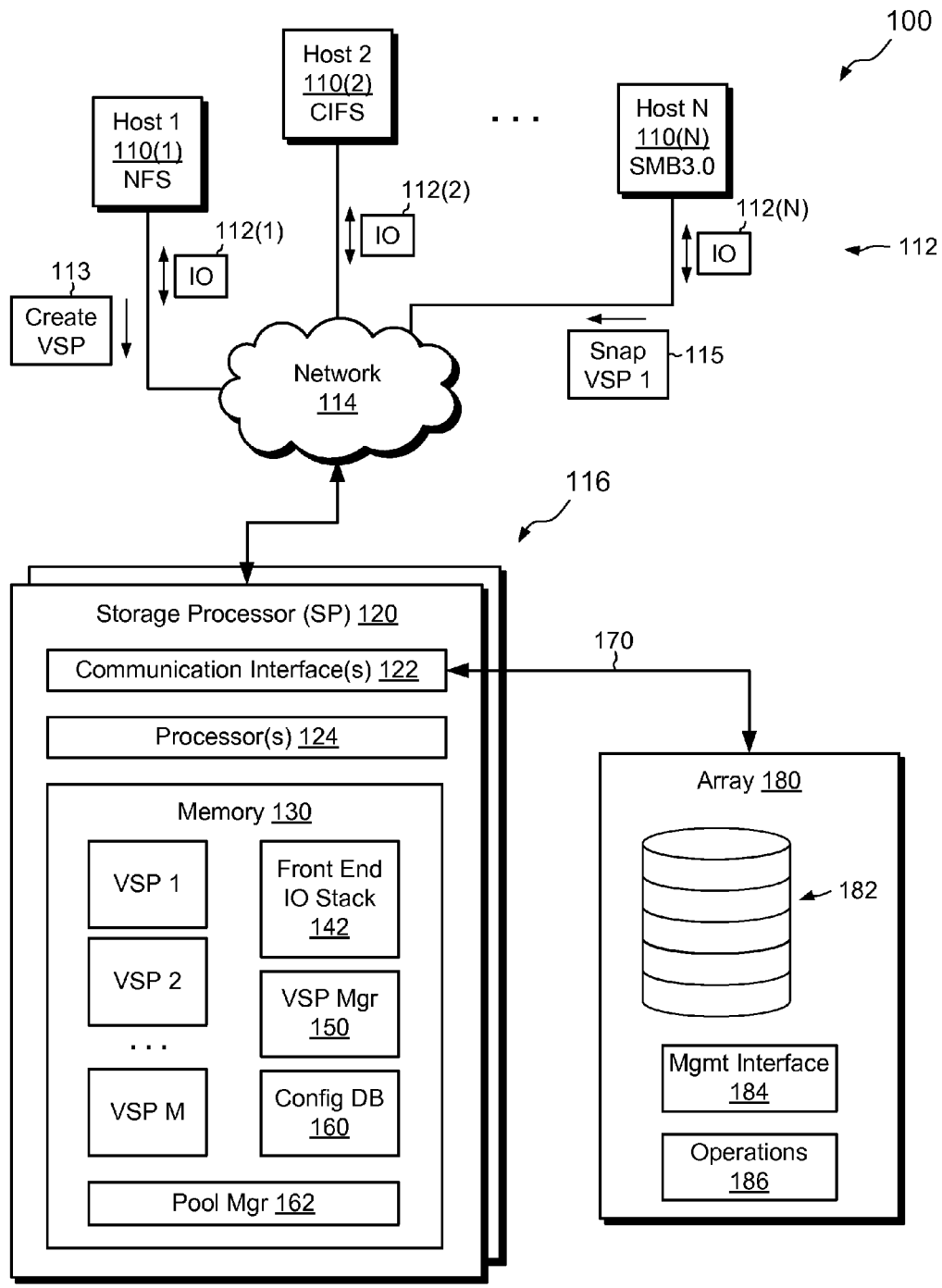
FIG. 1 is a block diagram showing an example environment in which the improved techniques hereof can be practiced.

FIG. 1 shows an example environment 100 in which embodiments of the improved technique hereof can be practiced. Here, multiple host computing devices ("hosts") 110(1) through 110(N) connect to a front end data storage apparatus 116 over a network 114, and the front end data storage apparatus 116 connects to a back-end, block-based array 180 over an interconnect 170.

The front end data storage apparatus 116 is seen to include a storage processor, or "SP," 120. It is understood that he front end data storage apparatus 116 may include multiple SPs like the SP 120. For example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of communicating with hosts 110(1-N) and with array 180.

The back-end, block based array (the "array") includes a set of storage devices 182, a management interface 184, and operations 186. The set of storage devices 182 may include, for example, hard disk drives, electronic flash drives, solid state drives, and/or other types of storage devices. The management interface 184 exposes a set of application programming interfaces (APIs), which allow the SP 120 (or another computing device) to configure the array 180. The operations 184 provide advanced features, such as replication and snap, for example. Such operations may act locally, e.g., within the array 180 and/or may act in coordination with a remote appliance or other equipment (e.g., to store replicated data and/or snaps at a different site). Without limiting the generality of the foregoing, an example of a suitable array for use in connection with the improvements hereof is the VMAX family of storage arrays, which are available from EMC Corporation of Hopkinton, Mass. Suitable non-limiting examples of advanced features include SRDF (Symmetrix Remote Data Facility) for replication and TimeFinder for snap. It is understood that the array 180 may include many more components, which are omitted from the figure for simplicity, such as its own storage processor(s), network interface, and user interface, for example.

The network 114 can be any type of network, such as a local area network (LAN), wide area network (WAN), the Internet, and/or some other type of network or combination of networks. The hosts 110(1-N) connect to the SP 120 over the network 114 using various file-based protocols, such as NFS, SMB 3.0, and CIFS, for example. Any number of hosts 110(1-N) may connect to the SP 120 over the network 114, using any of the above protocols, some subset thereof, or other protocols besides those shown.

The interconnect 170 connects the SP 120 to the array 180 and supports one or more block-based protocols, such as Fibre Channel, iSCSI, or InfiniBand, for example. Although the interconnect 170 is shown as a single point-to-point connection, it is understood that the interconnect 170 may itself be realized as a network (e.g. a TCP-IP network or a storage area network). Using a network, multiple front end data storage systems like the system 116 may connect to the array 180, and multiple arrays like the array 180 may connect to one (or more) front end data storage systems.

The SP 120 is seen to include one or more communication interfaces 122, a set of processing units 124, and memory 130. The communication interfaces 122 include, for example, adapters for converting electronic and/or optical signals received from the network 114 and from the interconnect 170 to electronic form for use by the SP 120, and for converting electronic signals from the SP 120 to electronic and/or optical signals for transmission over the network 114 and over the interconnect 170. The set of processing units 124 includes one or more processing chips and/or assemblies. In a particular example, the set of processing units 124 includes multiple multi-core CPU chips. The memory 130 includes both volatile memory (e.g., RAM), and non-volatile memory, such as one or more ROMs, disk drives, solid state drives (SSDs), and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are made to carry out the operations of the software constructs. Although certain software constructs are specifically shown and described, it is understood that the memory 130 typically includes many other software constructs, which are not shown, such as an operating system, various applications, processes, and daemons.

The memory 130 of the SP 120 is seen to provide multiple VSPs 1-M. Each of the VSPs 1-M is associated with a set of file systems, a set of servers (e.g., NFS and/or CIFS servers), and various properties and settings. In an example, each VSP has internal file systems (e.g., a configuration file system and a root file system) as well as any number of user file systems.

In an example, the SP 120 includes, or has access to, a configuration database 160. The configuration database 160 includes a set of records that store, for each VSP, information that identifies the VSP's file systems, servers, and settings. The configuration database 160 may reside on the SP 120, as shown, or at some other location in the data storage apparatus 116 accessible to the SP 120.

The memory 130 also provides a VSP manager 150. The VSP manager 150 manages lifecycle events of VSPs 1-M, such as VSP creation and deletion, as well as data operations performed on VSPs, such replication and snap.

The memory 130 further provides a front end TO stack 142. The front end TO stack ("TO stack") 142 receives and processes incoming requests from hosts 110(1-N) to perform file-based operations on file systems accessed through the SP 120. In an example, all file systems accessed through the SP 120 belong to a particular VSP (i.e., one of the VSPs 1-M). Each file system can belong to only a single VSP. The TO stack 142 processes incoming file-based requests (e.g., file reads and writes) by mapping files identified in the requests 112 to particular block-based storage locations on the array 180. Likewise, the TO stack 142 processes block-based input from the array 180 and maps the input to file-based information relative to particular file systems. Thus, the TO stack 142 manages the mapping of requests and responses between the hosts 110(1-N) and the array 180.

The memory 130 of the SP 120 still further provides a pool manager 162. The pool manager 162 manages, within the SP 120, the provisioning of storage for use by the file systems of the VSPs 1-M.

In example operation, a user operating one of the hosts (e.g., host 110(1)) issues a request 113 to the SP 120 to create a new VSP. The request 113 may specify a VSP name (e.g., "VSP 1") as well as other configuration information. In response to the SP 120 receiving the request 113, the VSP manager 150 establishes a new set of records in the configuration database 160 for VSP 1 and provisions storage to VSP 1 (e.g., from the array 180).

For example, the VSP manager 150 communicates with the array 180, via the management interface 184, and directs the array 180 to provision a set of storage resources for supporting the new VSP. For example, the VSP manager 150 directs the array 180 to provision a set of LUNs (one or more LUNs) from the storage devices 182 and to make the newly provisioned LUNs available, e.g., to export the LUNs over Fiber Channel, iSCSI, or InfiniBand, for example, so that the data storage apparatus 116 can discover the LUNs and access them using block-based requests via the interconnect 170. Although the word "LUNs" is presented in the plural form, this is for presentation purposes and it is understood that the "LUNs" may be realized as a single LUN.

Once the set of LUNs are provisioned on the array 180, the VSP manager 150 creates a storage pool for VSP 1 and assigns the newly provisioned LUNs to the storage pool. The pool manager 162 then renders the LUNs in the form of storage slices (e.g., 256 MB units of storage) and adds the slices to the storage pool. File systems of VSP 1 are then created on the storage pool, with the pool manager 162 provisioning slices (derived from the LUNs on the array 180) to the new file systems to meet their storage demands.

To summarize, the VSP manager 150 may perform the following activities in response to receiving the request 113 to create a new VSP:

Build a set of records in the configuration database 160 of the new VSP;

Direct the array 180 to create a set of LUNs to support storage for the new VSP;

Direct the array 180 to export the LUNs so they may be discovered by the SP 120;

Direct the pool manager 162 to render the LUNs as slices;

Direct the pool manager 162 to provision the slices to the storage pool; and

Build internal VSP file systems (e.g., a configuration file system and a root file system) from slices provisioned to the pool.

It is understood that, in some examples, these acts are performed implicitly, i.e., automatically, as a result of receiving the request 113.

The VSP manager 150 can change the size of the storage pool in response to usage. For example, as users create new file systems of VSP 1 and/or store more content on their existing file systems, the VSP manager 150 can direct the array 180 to extend any of the provisioned LUNs, so that more slices can be made available for supporting the additional file content. The VSP manager 150 may also direct the array 180 to provision a new LUN for supporting the new VSP. The VSP manager 150 can further shrink the storage pool if the provisioned storage is not fully utilized. For example, the VSP manager 150 can direct the array 180 to remove LUNs, to free portions of LUNs, and/or to shrink LUNs.

The LUNs supporting any VSP above may be assigned to a group, such that data operations, e.g., replication and snap, may be performed by operations 186 of the array 180 on the group of LUNs together. For example, a host (e.g., the host 110(N)) may issue a command 115 to perform a snap operation on VSP 1. In response to the command 115, the VSP manager 150 may respond in different ways.

In one example, the VSP manager 150 identifies each of the LUNs in the group of LUNs provisioned on the array 180 for VSP 1. For example, the VSP manager 150 may identify the particular pool assigned to VSP 1, e.g., by referencing the set of records in the configuration database 160 for VSP 1, and then access a separate data store to identify the LUNs on the array 180 that have been assigned to the identified pool. The VSP manager 150 then directs the array 180, via operations 186, to perform the designated operation (here, a snap) on each of the LUNs in the designated group.

In another example, the VSP manager 150 directs the array 180 to form a group itself from the set of LUNs provisioned to the new VSP. For example, the VSP manager 150 communicates with the array 180 via the management interface 184 and directs the array to establish a consistency group that includes the set of LUNs. Consistency groups are known in the art, and may be used by arrays to enforce consistent treatment of LUNs. Thus, for example, forming a consistency group from the set of LUNs ensures that all data operations (e.g., replication and snap) are performed on all members of the consistency group together, or that no operations are performed on any members at all. Further, the consistency group enforces consistency in time, such that any snap taken of a consistency group reflects the state of all elements of the consistency group at the same point in time.

In an example, the array 180 forms a consistency group from the set of LUNs, gives the consistency group an identifier (e.g., "Group A"), and stores the identifier along with its member LUNs internally. The VSP manager 150 may then communicate with the array 180 to obtain the group identifier and stores the group identifier on the SP 120 or in a location readily accessible to the SP 120, such as in the set of records for VSP 1 in the configuration database 160. Thereafter, the VSP manager 150 may direct the array 180 to perform a data storage operation by retrieving its local copy of the group identifier (e.g., Group A) and directing the array 180 to perform the requested operation on the identified consistency group, e.g., via a command to "Snap Group A."

It is understood that the VSP manager 150 may direct the array 180 to create the consistency group at any suitable time. For instance, in one example the VSP manager 150 directs the array 180 to form a consistency group when the VSP is first being created, e.g., as one of the implicit acts performed in response to receiving the command 113 to create a VSP. In another example, the VSP manager 150 waits until the SP 120 receives a command 115 to perform a data operation on the VSP and then direct the array 180 to form a consistency group in response to receiving the command 115.

Once VSP 1 has been created, the SP 120 may service requests 112 from any of hosts 110(1-N) authorized to access VSP 1 to read and/or write its files and directories, to create and delete file systems, and to perform other functions. Read and write requests 112 are processed by the IO stack 142.

It should be appreciated that specifying a particular set of LUNs for a particular VSP and providing the LUNs in a consistency group (or simply in a group) ensures that data storage operations, such as replication and snap, are performed at the VSP level of granularity. Thus, users can build any number of file systems on a VSP and be assured that the file systems will all receive the same treatment, as far as data storage operations are concerned, by virtue of their belonging to the same VSP. It should further be appreciated that it is the array 180, with its efficient and high-performance data processing, which performs the data storage operations applied at the VSP level of granularity. This is the case in spite of the array 180 not being required to have any awareness of the existence of VSPs. Rather, the disclosed technique provides VSP-level data storage operations by virtue of its mapping of particular VSPs to particular groups of LUNs.

Figure 2:
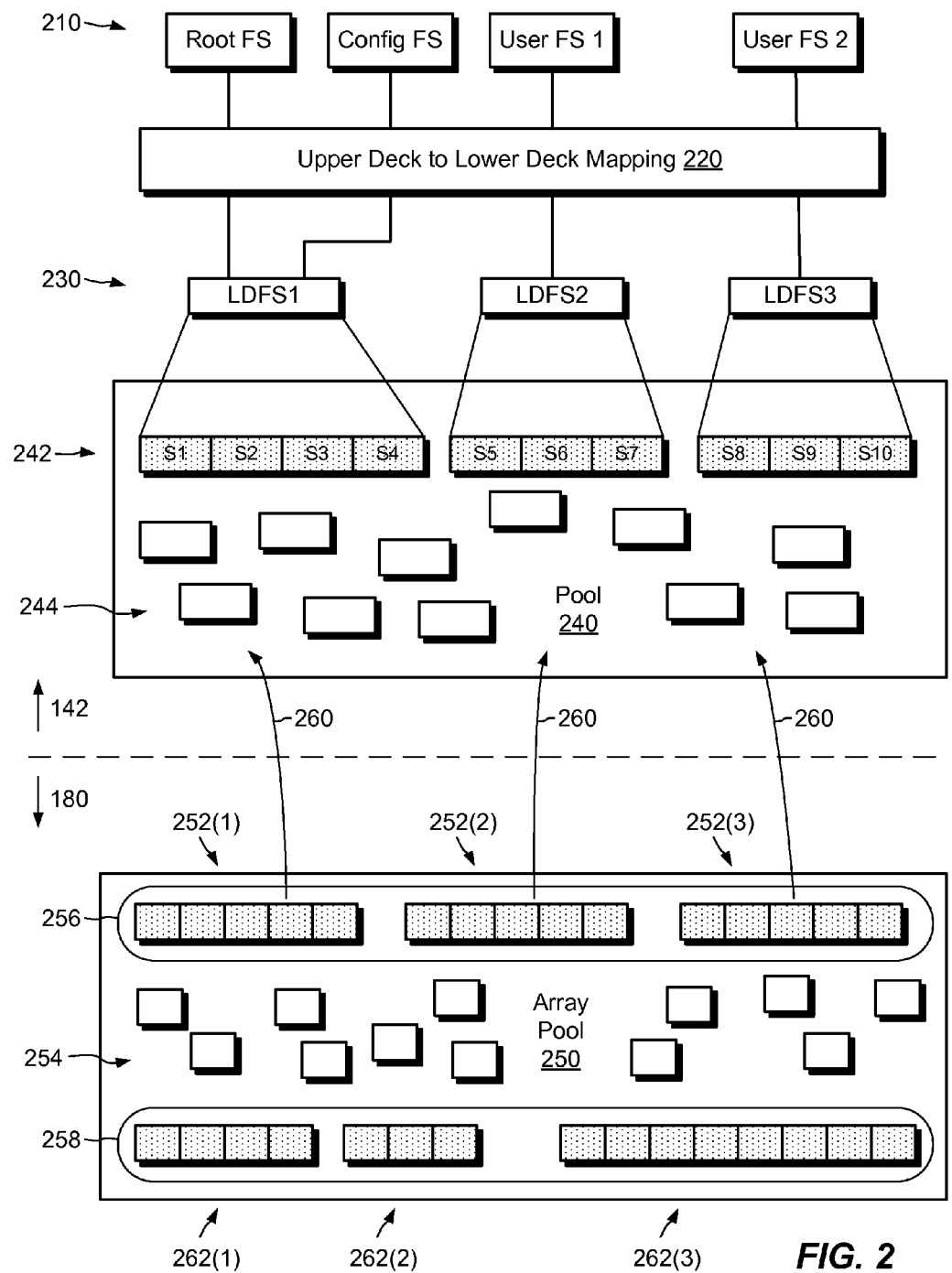
FIG. 2 is a block diagram showing an example stack-up of structures operated in the environment of FIG. 1.

FIG. 2 shows portions of the IO stack 142 and portions of the array 180 in additional detail. Here, the IO stack 142 is seen to include upper-deck file systems 210, upper deck to lower deck mapping 220, lower-deck file systems 230, and a storage pool 240. Also, the array 180 is seen to include an array pool 250. The structures shown represent an arrangement of storage for an illustrative VSP, in this case, a VSP having a root file system (Root FS), a configuration file system (Config FS) and two user file systems (User FS 1 and User FS 2).

The array pool 250 on the array 180 includes array slices 254, which are derived from the underlying storage devices 182. In response to requests from the VSP manager 150, the array 180 creates LUNs on the array 180 from the array slices 254. For example, the array 180 composes a set of LUNs 252(1), 252(2), and 252(3). In this example, each LUN is composed of five array slices 254 (for illustrative purposes; LUNs typically include more than five slices each and the number of slices in each LUN may be different). The array 180 has brought the LUNs 252(1), 252(2), and 252(3) together into a consistency group 256, so that the array 180 may perform data operations, such as replication and snap, consistently across the entire group of LUNs.

It is understood that the array 180 may support many VSPs, as well as other data objects, and that the array pool 250 may include other consistency groups. For example, FIG. 2 shows another consistency group 258 formed from three LUNs 262(1), 262(2), and 262(3). The LUNs 262(1), 262(2), and 262(3) may support storage for another VSP, such as VSP 2, and the consistency group 258 ensures that the array 180 performs data operations, such as replication and snap, consistently across the entire group of LUNs 262(1), 262(2), and 262(3) that support VSP 2.

Once the array 180 has created and exported the LUNs 252(1), 252(2), and 252(3) for discovery by the SP 120, the pool manager 162 may render the LUNs 252(1), 252(2), and 252(3) in the form of slices 244 and add the slices to the storage pool 240 (as shown by the arrows 260). The slices 244 need not be the same size as the array slices 254. In an example, the array slices 254 are each 1 GB in size, whereas the slices 244 in the pool 240 are each 256 MB (the figure is not drawn to scale). In an example, the pool manager 162 renders the LUNs 252(1), 252(2), and 252(3) in the form of slices 244 by carving the block offset ranges of the LUNs 252(1), 252(2), and 252(3) into slice-sized segments, where the slice-sized segments each have the size of the slices 244.

With slices 244 provisioned to the pool 240 from the set of LUNs 252(1), 252(2), and 252(3) in the array 180, the pool manager 162 running on the SP 120 may provision the slices 244 to any number of lower-deck file systems 230. For example, the pool manager 162 may provision slices S1 to S4 to a first lower-deck file system (LDFS1). The pool manager 162 may further provision slices S5 to S7 to a second lower-deck file system (LDFS2) and may provision slices S8-S10 to a third lower-deck file system (LDFS3). These provisioned slices of the pool 240 collectively form slices 242, which together provide storage for supporting the lower-deck file systems 230.

In an example, the data storage apparatus 116 manages the lower-deck file systems 230 internally, i.e., the hosts 110(1-N) do not generally access the lower-deck file systems 230 directly. Each of the lower-deck file systems 230 includes one or more files, with each file typically representing a data object, such as an upper-deck file system (e.g., one of the upper-deck file systems 210). Thus, each file of a lower-deck file system may store a representation of a complete upper-deck file system. For example, LDFS1 includes one file that stores a complete representation of a root file system (Root FS) and another file that stores a complete representation of a configuration file system (Config FS). Similarly, LDFS2 includes a file that stores a complete representation of a first user file system (User FS 1) and LDFS3 includes a file that stores a complete representation of a second user file system (User FS 2). Mapping 220 expresses the lower-deck files as complete file systems and manages the correspondence between blocks of the upper-deck file systems 210 and blocks of the lower-deck file systems 230.

It should be appreciated that the lower-deck file systems 230 may also include files that store snaps of the primary objects they represent (e.g., LDFS3 may store files that represent snaps of User FS 2). However, because embodiments hereof call for the array 180 to snap LUNs that support a VSP, the lower-deck file systems 230 need not themselves include files that represent snaps, and each lower-deck file system (except LDFS1, in the example shown) may include only a single file.

Each lower-deck file system includes metadata, such as inodes and indirect blocks (not shown), which describe the file(s) that the respective lower-deck file system stores. Also, it is understood that the data within a file of a lower-deck file system includes both data and metadata of the upper-deck file system that the file represents. Lower-deck file systems may store other types of data objects besides upper-deck file systems. Additional information about lower-deck file systems and upper-deck file systems may be found in copending U.S. patent application Ser. No. 13/828,322, filed on Mar. 14, 2013, the contents and teachings of which are hereby incorporated by reference in their entirety.

In an example, the pool 240 provisions slices 244 to the lower-deck file systems 230 as storage is required, consistently with a thin provisioning storage model. Thus, for example, if LDFS2 requires additional storage to support user files being stored therein, the pool manager 162 may provision another one of the slices 244 to LDFS2. Likewise, if the slices of LDFS2 are underutilized (e.g., if there is more than one slices' worth of free space), the pool manager 162 may move content off a slice (i.e., "evacuate" the slice) and return the evacuated slice to the pool 240. The returned slice may then be repurposed to any of the lower-deck file systems 230, i.e., to any lower-deck file systems that share the same pool 240 and that require a new slice.

Previously, the repurposing of slices to other file systems that share the same pool was as much as could be done to reclaim storage. For example, slices could not be repurposed to data objects in other pools or to data objects that do not use a pool. Additional improvements hereof overcome such limitations in repurposing storage, however.

Figure 3A:
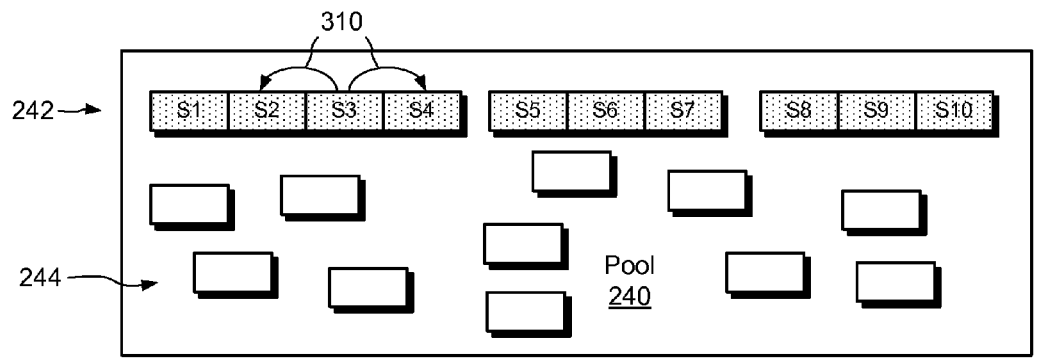
FIGS. 3A and 3B are block diagrams showing an example sequence for returning provisioned storage back to an array for repurposing to other resources.
Figure 3B:
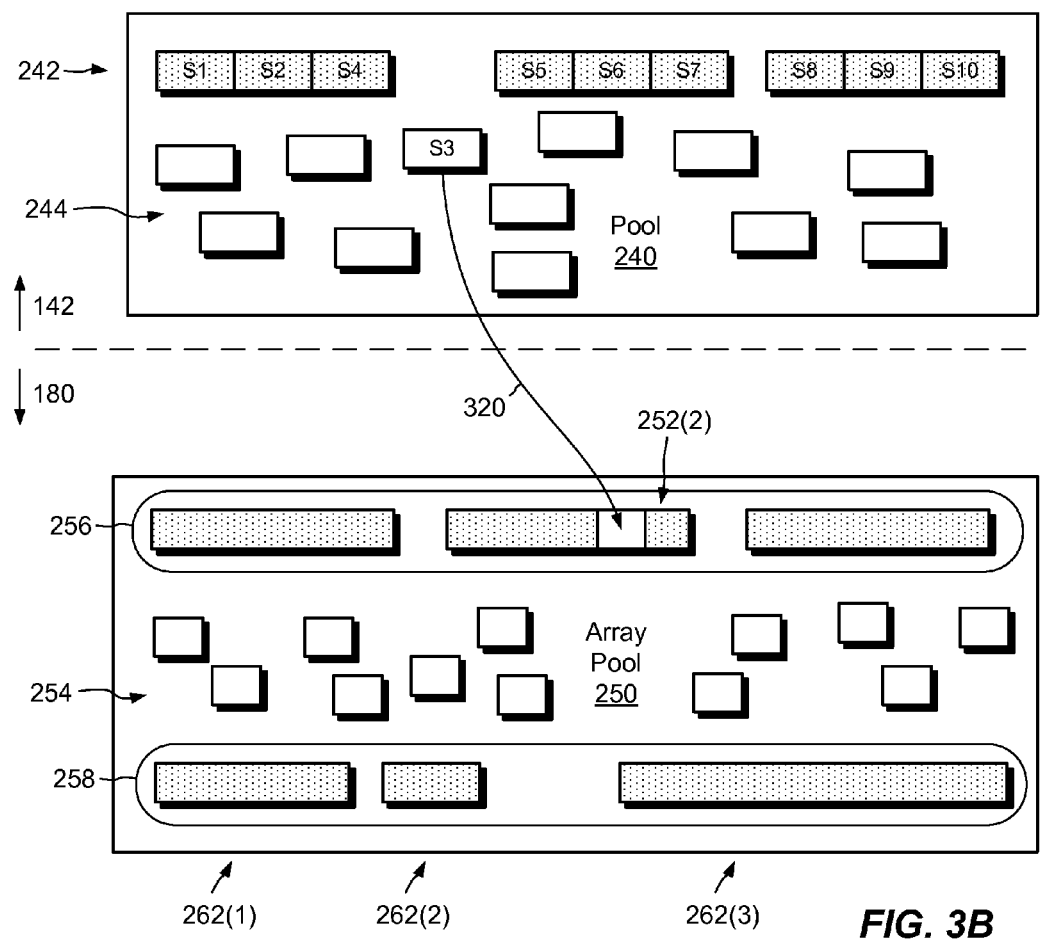

FIGS. 3A and 3B show an example sequence for returning storage from the pool 240 to the array 180, so that the storage may be repurposed to data objects that are not derived from the pool 240. In FIG. 3A, arrows 310 show the pool manager 162 evacuating slice S3 to move its contents to other slices (here, to S2 and S4) that support the same object (LDFS1).

In FIG. 3B, the pool manager 162 has freed the slice S3, which has been made available for repurposing. Slices S1, S2, and S4 continue to support LDFS1. If the pool 240 as a whole is underutilized, then the slice S3 may be returned to the array 180, rather than being used to support another data object served by the pool 240. Thus, the pool 240 as a whole may be made to shrink. Arrow 320 shows the slice returning operation. Here, pool manager 162 sends a message to the management interface 184 on the array 180. The message identifies a particular LUN (here, LUN 252(2)) and a particular offset range within the identified LUN, i.e., the range from which the pool manager 162 derived the slice S3. The pool manager 162 then directs the array 180 to free the specified offset range within the identified LUN. The free space is indicated by the unshaded region of the LUN 252(2). The array 180 may then return the freed region of the LUN 252(2) to the array pool 250 (i.e., the free portion thereof), but the process for returning the freed region to the array pool 250 and repurposing the freed region varies depending on whether the LUN 252(2) is itself thinly provisioned or thickly (densely) provisioned from the array pool 250.

Figure 4A:
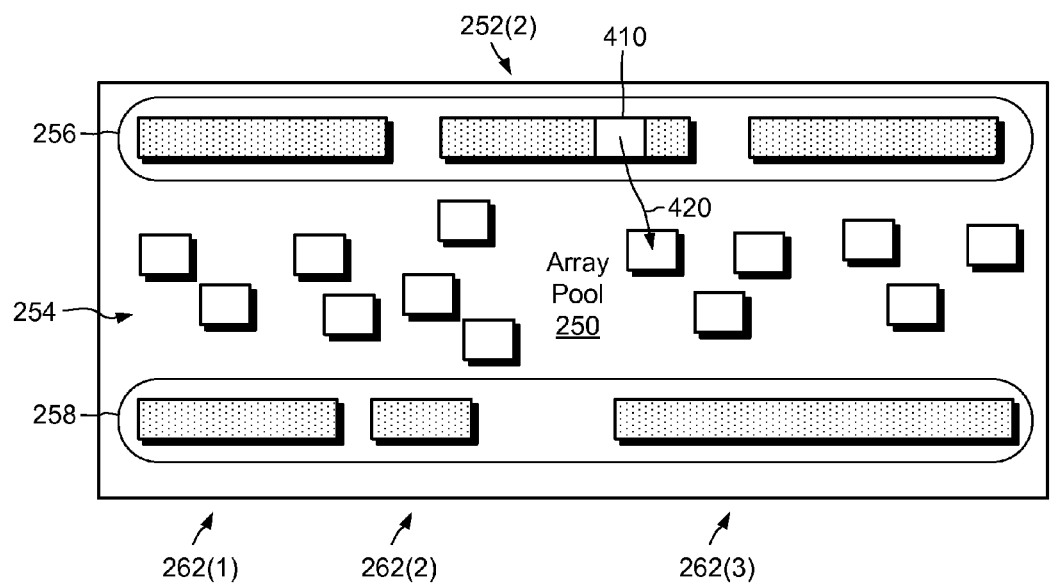
FIGS. 4A and 4B are block diagrams showing a continuation of the example sequence shown in FIGS. 3A and 3B, and address the case where a LUN on the array is thinly provisioned by the array.
Figure 4B:
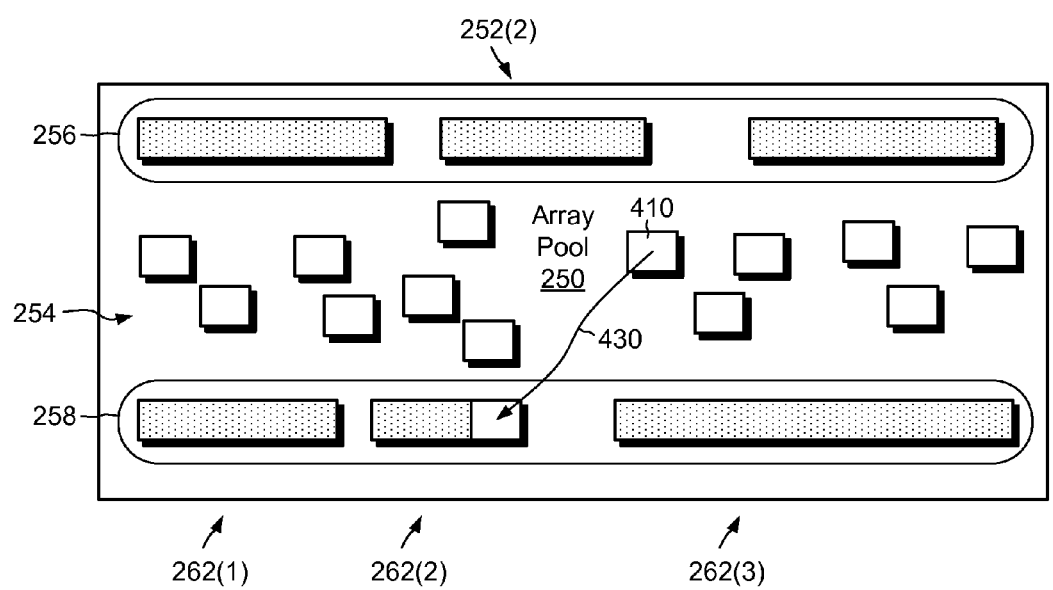

FIGS. 4A and 4B show an example sequence for returning the freed region to the array pool 250 when the LUN containing the freed region is itself thinly provisioned from the array pool 250. Because the LUN 252(2) has been thinly provisioned, the freed region, identified here with reference 410, may simply be returned to the array pool 250, as shown by arrow 420, provided the freed region is large enough to span a complete slice of the array pool 250. As with the pool 240, storage is provisioned and returned to the array pool 250 in slice-sized increments. As array slices 254 may be different in size from slices 244 of the pool 240, it may be necessary to free additional contiguous space on the LUN 252(2) before enough space is obtained to make up a complete array slice 254. The pool manager 162 may direct the array 180 to evacuate space from portions of the LUN 252(2), assuming space is available elsewhere on the LUN 252(2), to form a complete free slice, or the array 180 may initiate this process on its own. Once a contiguous range has been made available on the LUN 252(2) that matches the size of an array slice 254, and array slice may be returned to the array pool 250.

As shown in FIG. 4B, the array slice 410 is in the array pool 250, and the LUN 252(2) has been made smaller. The array 180 may then repurpose the slice 410, via the operation shown by arrow 430, to extend the LUN 262(2) used by VSP 2. For example, the VSP manager 150 directs the array 180 to extend LUN 262(2) so that the pool supporting VSP 2 can grow. The pool manager 162 may carve the extended space of LUN 262(2) into new slices, and add the slices to the pool 240 used by VSP 2. In this manner, storage that was once provisioned for use by one VSP is repurposed for use by another VSP, even though the two VSPs are built upon different pools and are formed from LUNs that belong to different consistency groups.

Figure 5A:
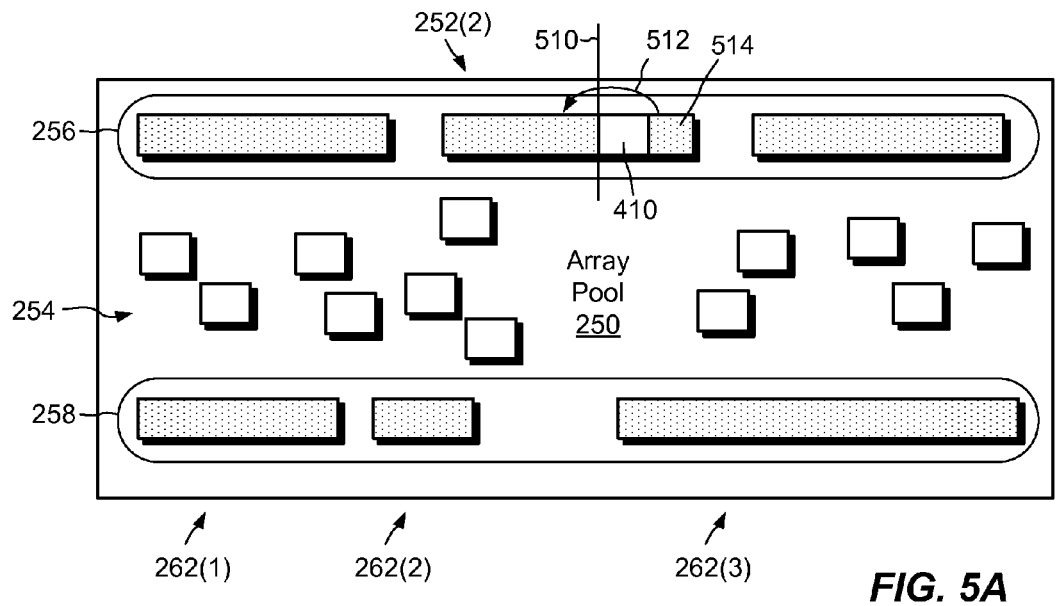
FIGS. 5A and 5B are block diagrams showing a continuation of the example sequence shown in FIGS. 3A and 3B, and address the case where a LUN on the array is densely provisioned by the array.
Figure 5B:
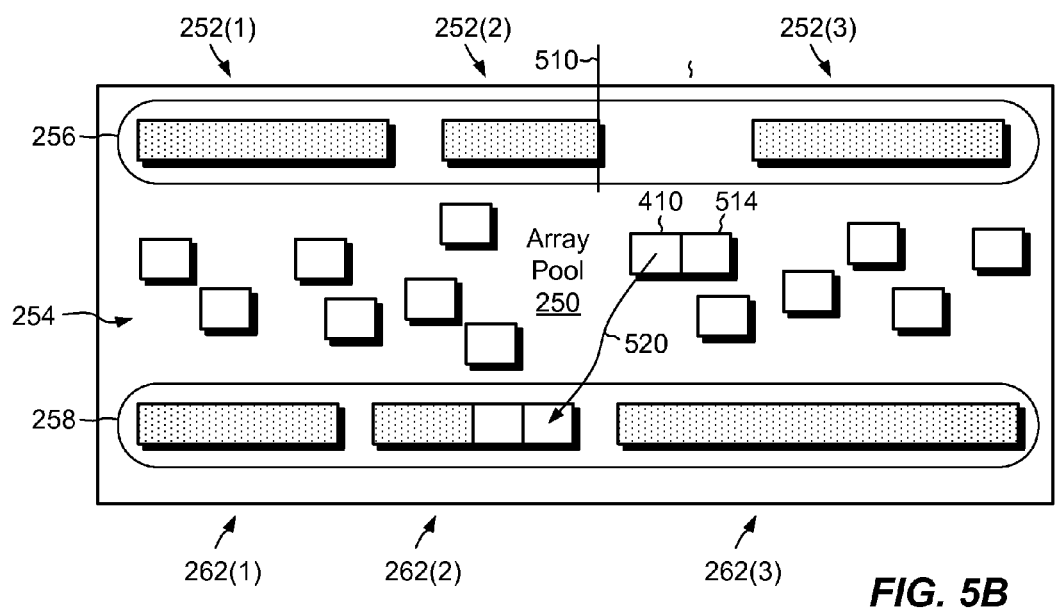

FIGS. 5A and 5B show an example sequence for returning the freed region to the array pool 250 when the LUN containing the freed region is itself thickly (densely) provisioned from the array pool 250. Because the LUN 252(2) has been thickly provisioned, its space is reserved and thus may not be used for other objects. To repurpose the freed region 410, it is necessary first either to delete the LUN 252(2) entirely or to shrink the LUN 252(2), i.e., to redefine it to be a smaller LUN.

The VSP manager 150 may direct the array 180 to redefine the LUN 252(2) to be a smaller LUN by first moving any content (VSP data and metadata) stored on the LUN at locations beyond a predetermined offset 510 and then truncating the LUN 252(2) to the predetermined offset 510. Preferably, the offset 510 is chosen to be an integer number of array slice units from the end of the LUN 252(2). In the example shown in FIG. 5A, the LUN 252(2) includes a region 514 which includes VSP data and metadata. As the region 514 is located at a higher offset range than the predetermined offset 510, the VSP manager 150 directs the array 180 to evacuate the region 514, as indicated by arrow 512, by moving VSP data and metadata stored therein to locations below the predetermined offset 510. Once all VSP data and metadata in the region 514 have been evacuated, the VSP manager 150 directs the array 180 to truncate the LUN 252(2) to the offset 510.

As shown in FIG. 5B, the LUN 252(2) has been truncated and the regions 410 and 514 have been returned to the array pool 250. In this example, it is assumed for simplicity that the size of the array slices 254 is the same as the size of the slices 244. The slices 410 and 514 may then be repurposed as shown by arrow 520, by extending the LUN 252 in substantially the same way as described above in connection with FIG. 4B. Thus, storage that was once provisioned for use by one VSP is repurposed for use by another VSP, regardless of whether the LUNs that provide the underlying storage are thinly provisioned or thickly provisioned.

Figure 6:
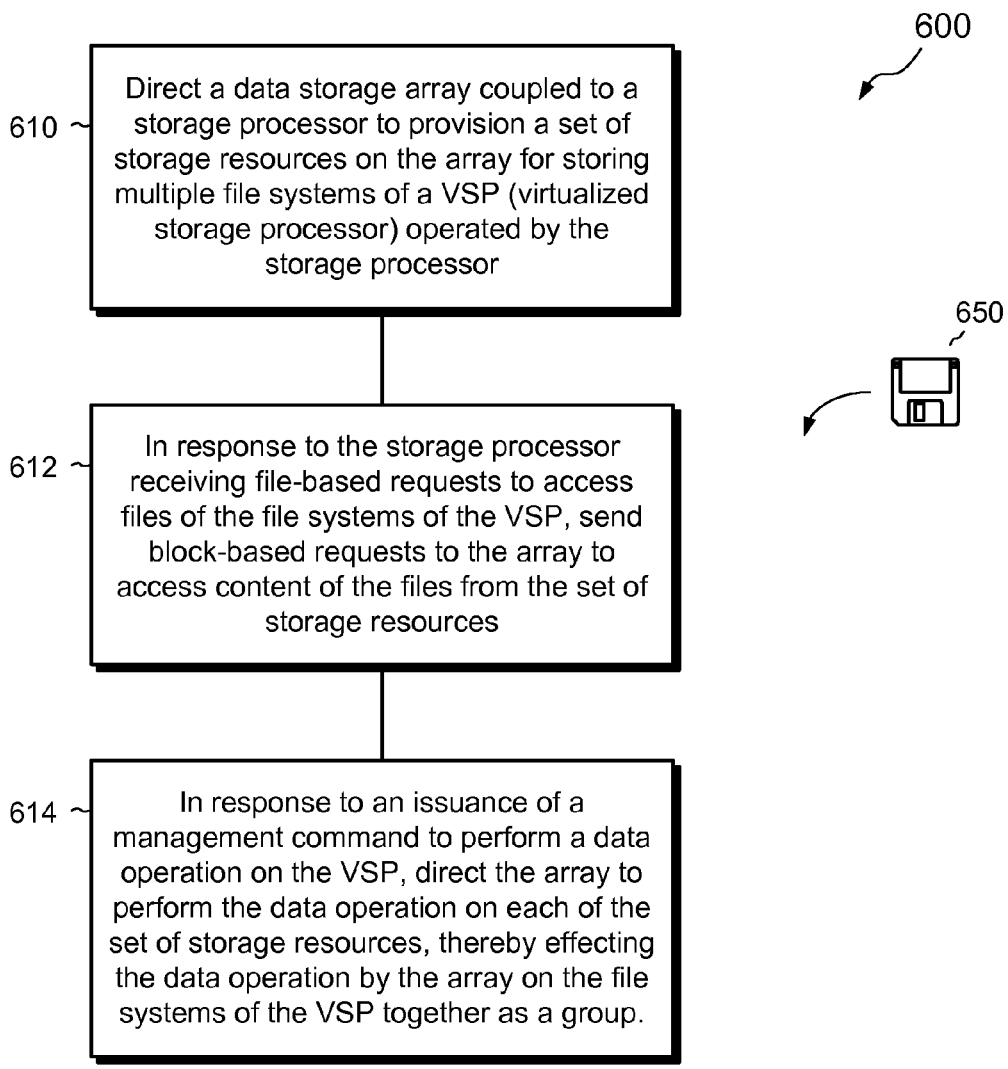
FIG. 6 is a flowchart showing an example process for managing data storage operations in the environment of FIG. 1.

FIG. 6 shows a process 600 that may be carried out in connection with the environment 100. The process 600 is typically performed by the software constructs, described in connection with FIG. 1, which reside in the memory 130 of the SP 120 and are run by the set of processing units 124. The various acts of the process 600 may be ordered in any suitable way. Accordingly, embodiments may be constructed in which acts are performed in orders different from those illustrated, which may include performing some acts simultaneously, even though the acts are shown as sequential in the illustrated embodiments.

At step 610, a data storage array coupled to a storage processor is directed to provision a set of storage resources on the array for storing multiple file systems of a VSP (virtualized storage processor) operated by the storage processor. For example, in response to one of the hosts 110(1-N) issuing a request 113 to create a VSP, the VSP manager 150 directs the array 180 to provision a set of LUNs 252(1-3) on the array 180 for storing multiple file systems, such as a root file system, a configuration file system, and any number of user file systems, of a VSP (e.g., VSP 1) operated by the SP 120.

At step 612, in response to the storage processor receiving file-based requests to access files of the file systems of the VSP, block-based requests are sent to the array to access content of the files from the set of storage resources. For example, in response to receiving file-based requests 112 (e.g., via NFS, CIFS, SMB 3.0) to access files of one of the VSPs 1-M, the IO stack 142 processes the requests 112 to generate block-based requests, and the SP 120 sends the block-based requests to the array 180 over the interconnect 170.

At step 614, in response to an issuance of a management command to perform a data operation on the VSP, the array is directed to perform the data operation on each of the set of storage resources, thereby effecting the data operation by the array on the file systems of the VSP together as a group. For example, in response to the command 115 to "Snap VSP 1," the VSP manager 150 directs the array 180 to use the operations 186 to take a snap of the set of LUNs 252(1-3). Taking a snap of the set of LUNs 252(1-3) effectively snaps the file systems of the VSP that is provisioned from the LUNs.

An improved technique for managing data storage operations in a data storage system has been described for a data storage system having a file-based front end system 116 and a block-based back end array 180. The technique includes provisioning a set of storage resources (e.g., LUNs 252(1-3)) on the array 180 for use exclusively with one or more virtualized storage processors (VSPs), where each VSP is associated with multiple file systems. In response to a management command to perform a data storage operation on a VSP, the back-end array 180 performs the specified operation on the provisioned set of storage resources. Thus, the back-end array performs the data operation exclusively on the VSP (or on multiple VSPs) and therefore on all of its constituent file systems as one. The above-described technique also leverages the advanced features of the back-end array 180, which may provide high-performance data processing and high efficiency. Further, the improved technique allows storage used by one VSP to be repurposed for use with another VSP, even if the two VSPs are served from different pools.

Having described certain embodiments, numerous alternative embodiments or variations can be made. For example, it has been shown and described that one VSP is associated with one pool 240, which derives its resources from one set of LUNs on the array 180. However, this is merely one effective example of a way in which the invention can be practiced. In other examples, multiple VSPs may be provided on a single pool 240, which derives its resources from a single set of LUNs on the array 180. Providing multiple VSPs on a single pool results in all such VSPs being treated the same way from the standpoint of data storage operations. For example, snap and replication settings and activities operated by the array 180 will be common to all VSPs provided on the same pool derived from the same set of LUNs.

It is also possible and within the scope of the invention hereof for a single VSP to be built over multiple pools 240, where each pool derives its storage resources from a different set of LUNs on the array 180. This example may be handled in various ways. According to one approach, the consistency group (or simply the group) for the VSP can be defined to include the sets of LUNs supporting all of the multiple pools. Data storage operation settings and actions are then performed together over all the sets of LUNs supporting the multiple pools on which the VSP is built. According to another approach, each pool has its own consistency group (or simply group), and file systems of the VSP hosted from different pools are allowed to have different data storage operation settings and actions.

Also, although replication and snap have been described as examples of data storage operations that may be leveraged by the array 180, data storage operations are not limited to these operations. For example, compression, encryption, de-duplication, and other operations may be applied in the same manner as has been described above for replication and snap, e.g., with the array 180 performing the operations on a set of storage resources from which one or more VSPs are provisioned.

Also, although the improvements hereof have been described in connection with hosts connecting to a front-end data storage system, which in turn connects to a backend array, these systems may alternatively be combined, or their constituents can be rearranged or repackaged in other forms. For example, the hosts 110(1-N) can be loaded with software that enables them to perform some or all of the functions disclosed for the SP 120.

Also, although the storage resources provisioned for storing the file systems of a VSP have been described as LUNs (e.g., LUNs 252(1-3)), this is merely an example. Another example would be to directly provision array slices 254 to the pool 240 without forming LUNs. Consistency groups (or simply groups) could then be formed from aggregations of array slices 254, rather than from groups of LUNs.

Also, the request 113 to create a new VSP and the command 115 to snap a VSP have been shown and described as originating from hosts. This again is merely an example, as such requests and commands may originate from anywhere, including within the SP 120, within some other SP, from a separate administrative console, from a remote system, or from any other source or location.

Further, although features are shown and described with reference to particular embodiments, examples, and variants hereof, such features may be included and hereby are included in any of the disclosed embodiments, examples, and variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 650 in FIG. 6). Multiple computer-readable media may be used. The medium (or media) may be encoded with instructions which, when executed on one or more computers or other processors, perform methods that implement the various processes described herein. Such medium (or media)

may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of managing data storage operations, comprising:
    directing a data storage array coupled to a storage processor to provision a set of storage resources on the array for storing multiple file systems of a VSP (virtualized storage processor) operated by the storage processor;
    operating multiple VSPs, including the VSP, on the storage processor, each of the VSPs including a respective plurality of file systems stored in a respective set of storage resources on the array such that each set of storage resources on the array is exclusive to a respective one of the VSPs;
    in response to the storage processor receiving file-based requests to access files of the file systems of the VSP, sending block-based requests to the array to access content of the files from the set of storage resources; and
    in response to an issuance of a management command to perform a data operation on the VSP, directing the array to perform the data operation on each of the set of storage resources for the VSP but not on any sets of storage resources of other VSPs of the multiple VSPs, thereby effecting the data operation by the array exclusively on the file systems of the VSP together as a group.

2. The method of claim 1, wherein directing the array to provision the set of storage resources is performed in response to receiving a request to create a VSP, and wherein directing the array to provision the set of storage resources includes directing the array to provision a set of LUNs (logical unit numbers) in the array and to make the set of LUNs available to the storage processor via block-based requests from the storage processor.

3. The method of claim 2, further comprising:
    creating a storage pool for the VSP on the storage processor;
    assigning the set of LUNs in the array to the storage pool;
    adding storage slices derived from the set of LUNs to the storage pool; and
    provisioning at least some of the slices from the storage pool to the file systems of the VSP for storing data and metadata of the file systems in the slices of the pool derived from the set of LUNs in the array.

4. The method of claim 3, wherein, in response to the issuance of the management command, the method further comprises, for each of the set of LUNs, the storage processor directing the array to perform the data operation on the respective LUN.

5. The method of claim 3, further comprising, by the storage processor:
    directing the array to form a consistency group that includes the set of LUNs; and
    storing an identifier of the consistency group,
    wherein directing the array to perform the data operation on each of the set of storage resources includes (i) retrieving the identifier of the consistency group and (ii) issuing a command to the array to perform the data operation on the consistency group specified by the retrieved identifier without specifying the LUNs individually.

6. The method of claim 5, wherein directing the array to form the consistency group and storing the identifier of the consistency group are performed in response to receiving the request to create the VSP.

7. The method of claim 5, wherein directing the array to form the consistency group and storing the identifier of the consistency group are performed in response to the issuance of the management command to perform the data operation on the VSP.

8. The method of claim 3, further comprising expanding the storage pool by one of:
    (i) directing the array to extend at least one of the set of LUNs; and
    (ii) directing the array to add a new LUN of the array to the set of LUNs.

9. The method of claim 3, wherein each slice is derived from a range of a respective LUN of the set of LUNs, and wherein the method further comprises shrinking the storage pool, wherein shrinking the storage pool includes:
    evacuating a slice in the storage pool of data and metadata pertaining to the set of file systems; and
    sending a message to the array (i) identifying the range of the particular LUN from which the evacuated slice is derived and (ii) directing the array to free the identified range of the LUN.

10. The method of claim 9, wherein the LUN has been thinly provisioned from an array pool of the array, and wherein directing the array to free the identified range of the LUN includes directing the array to return the space occupied by the identified range of the LUN back to the array pool for repurposing to other LUNs that are not part of the set of LUNs.

11. The method of claim 9, wherein the LUN has a predetermined size and has been densely provisioned, and wherein shrinking the storage pool further includes:
    directing the array to move all data and metadata for the set of file systems away from a range of the LUN beyond a predetermined offset; and
    directing the array to change the size of the LUN so that the LUN itself becomes smaller and does not extend beyond the predetermined offset, such that storage freed from the end of the LUN can be repurposed to other LUNs that are not part of the set of LUNs.

12. The method of claim 9, wherein the LUN has a predetermined size and has been densely provisioned, and wherein shrinking the storage pool further includes directing the array to delete the LUN.

13. The method of claim 3, wherein the data operation includes one of (i) a snap operation and (ii) a replication operation.

14. The method of claim 1, wherein each of the multiple VSPs aggregates the respective plurality of file systems and defines a set of file-based servers through which the plurality of file systems is accessed, the set of file-based servers including at least one of an NFS (Network File System) server or a CIFS (Common Internet File System) server.

15. The method of claim 14, wherein the multiple VSPs operating on the storage processor and share a common IO stack operating on the storage processor, the IO stack receiving requests from hosts to perform file-based operations on files of the VSPs.

16. The method of claim 1, wherein the management command is a command to take a snap of the VSP, and wherein directing the array to take a snap of the VSP includes directing the array to snap the set of storage resources on which the file systems of the VSP are stored, but not to snap any set of storage resources on which file systems of any other VSP operated on the storage processor are stored.

17. The method of claim 1, wherein the data operation is for performing one of compression, encryption, or de-duplication on the VSP, and wherein directing the array to perform the data operation on the VSP includes directing the array to perform one of compression, encryption, or de-duplication on the set of storage resources on which the file systems of the VSP are stored, but not to perform the data operation on any set of storage resources on which file systems of any other VSP operated on the storage processor are stored.

18. A data storage apparatus, comprising:
a storage processor including a set of processing units and memory, coupled to the set of processing units, the memory storing executable instructions, which when executed by the set of processing units cause the set of processing units to perform a method of managing data storage operations, wherein the method comprises:
directing a data storage array coupled to the storage processor of the data storage apparatus to provision a set of storage resources on the array for storing multiple file systems of a VSP (virtualized storage processor) operated by the storage processor;
operating multiple VSPs, including the VSP, on the storage processor, each of the VSPs including a respective plurality of file systems stored in a respective set of storage resources on the array such that each set of storage resources on the array is exclusive to a respective one of the VSPs;
in response to the storage processor receiving file-based requests to access files of the file systems of the VSP, sending block-based requests to the array to access content of the files from the set of storage resources; and
in response to an issuance of a management command to perform a data operation on the VSP, directing the array to perform the data operation on each of the set of storage resources for the VSP but not on any sets of storage resources of other VSPs of the multiple VSPs, thereby effecting the data operation by the array exclusively on the file systems of the VSP together as a group.

19. The data storage apparatus of claim 18, wherein directing the array to provision the set of storage resources is performed in response to receiving a request to create a VSP, wherein directing the array to provision the set of storage resources includes directing the array to provision a set of LUNs (logical unit numbers) in the array and to make the set of LUNs available to the storage processor via block-based requests from the storage processor, and wherein the method further comprises:
creating a storage pool for the VSP on the storage processor;
assigning the set of LUNs in the array to the storage pool;
adding storage slices derived from the set of LUNs to the storage pool; and
provisioning at least some of the slices from the storage pool to the file systems of the VSP for storing data and metadata of the file systems in the slices of the pool derived from the set of LUNs in the array.

20. The data storage apparatus of claim 19, wherein each slice is derived from a range of a respective LUN of the set of LUNs, wherein the LUN has a predetermined size and has been densely provisioned, and wherein the method further comprises:
evacuating a slice in the storage pool of data and metadata pertaining to the set of file systems;
sending a message to the array (i) identifying the range of the particular LUN from which the evacuated slice is derived and (ii) directing the array to free the identified range of the LUN;
directing the array to move all data and metadata for the set of file systems away from a range of the LUN beyond a predetermined offset; and
directing the array to change the size of the LUN so that the LUN itself becomes smaller and does not extend beyond the predetermined offset, such that storage freed from the end of the LUN can be repurposed to other LUNs that are not part of the set of LUNs.

21. A non-transitory computer readable medium including instructions which, when executed by a set of processing units, cause the set of processing units to perform a method of managing data storage operations, wherein the method comprises:
directing a data storage array coupled to a storage processor to provision a set of storage resources on the array for storing multiple file systems of a VSP (virtualized storage processor) operated by the storage processor;
operating multiple VSPs, including the VSP, on the storage processor, each of the VSPs including a respective plurality of file systems stored in a respective set of storage resources on the array such that each set of storage resources on the array is exclusive to a respective one of the VSPs;
in response to the storage processor receiving file-based requests to access files of the file systems of the VSP, sending block-based requests to the array to access content of the files from the set of storage resources; and
in response to an issuance of a management command to perform a data operation on the VSP, directing the array to perform the data operation on each of the set of storage resources for the VSP but not on any sets of storage resources of other VSPs of the multiple VSPs, thereby effecting the data operation by the array exclusively on the file systems of the VSP together as a group.

22. The non-transitory computer readable medium of claim 21, wherein directing the array to provision the set of storage resources is performed in response to receiving a request to create a VSP, wherein directing the array to provision the set of storage resources includes directing the array to provision a set of LUNs (logical unit numbers) in the array and to make the set of LUNs available to the storage processor via block-based requests from the storage processor, and wherein the method further comprises:
creating a storage pool for the VSP on the storage processor;
assigning the set of LUNs in the array to the storage pool;

adding storage slices derived from the set of LUNs to the storage pool; and provisioning at least some of the slices from the storage pool to the file systems of the VSP for storing data and metadata of the file systems in the slices of the pool derived from the set of LUNs in the array.

23. The non-transitory computer readable medium of claim 22, wherein each slice is derived from a range of a respective LUN of the set of LUNs, wherein the LUN has been thinly provisioned from an array pool of the array, and wherein the method further comprises:

evacuating a slice in the storage pool of data and metadata pertaining to the set of file systems;

sending a message to the array (i) identifying the range of the particular LUN from which the evacuated slice is derived and (ii) directing the array to free the identified range of the LUN, including directing the array to return the space occupied by the identified range of the LUN back to the array pool for repurposing to other LUNs that are not part of the set of LUNs.

24. The non-transitory computer readable medium of claim 23, wherein the data operation includes one of (i) a snap operation and (ii) a replication operation.

\* \* \* \* \*